United States Patent
Kelly et al.

(10) Patent No.: US 8,657,162 B2
(45) Date of Patent: Feb. 25, 2014

(54) RECHARGE INSERT FOR CLEANING, SANITIZING OR DISINFECTANT FLUID SPRAY SYSTEM

(76) Inventors: Albert R. Kelly, Douglaston, NY (US); George Schmidt, Douglaston, NY (US); Denise F. Ortell, Douglaston, NY (US)

(*) Notice: Subject to any disclaimer, the term of this patent is extended or adjusted under 35 U.S.C. 154(b) by 544 days.

(21) Appl. No.: 12/772,399

(22) Filed: May 3, 2010

(65) Prior Publication Data

US 2011/0114675 A1 May 19, 2011

Related U.S. Application Data

(63) Continuation-in-part of application No. 12/214,516, filed on Jun. 20, 2008, now Pat. No. 7,708,170, and a continuation-in-part of application No. 10/934,960, filed on Sep. 7, 2004, now abandoned.

(51) Int. Cl.
*B67D 7/58* (2010.01)

(52) U.S. Cl.
USPC ........ 222/382; 222/158; 222/325; 222/383.1; 222/464.2

(58) Field of Classification Search
USPC ........ 222/382, 383.1, 464.1, 325, 464.2, 157, 222/158; 239/333; 15/104.93
See application file for complete search history.

(56) References Cited

U.S. PATENT DOCUMENTS

| | | | | | |
|---|---|---|---|---|---|
| 3,870,147 | A | * | 3/1975 | Orth | 206/222 |
| 3,966,089 | A | * | 6/1976 | Klingaman | 222/88 |
| 4,088,246 | A | * | 5/1978 | Klingaman | 222/88 |
| 4,418,846 | A | * | 12/1983 | Pong et al. | 222/189.1 |
| 4,530,540 | A | * | 7/1985 | Hayden et al. | 297/341 |
| 5,529,216 | A | * | 6/1996 | Klima et al. | 222/130 |
| 5,947,332 | A | * | 9/1999 | Klima et al. | 222/82 |
| 6,250,511 | B1 | * | 6/2001 | Kelly | 222/382 |
| 7,708,170 | B2 | * | 5/2010 | Kelly et al. | 222/382 |
| 2011/0248052 | A1 | * | 10/2011 | Kelly et al. | 222/325 |

* cited by examiner

*Primary Examiner* — Frederick C Nicolas
(74) *Attorney, Agent, or Firm* — Evelyn M. Sommer

(57) ABSTRACT

A recharge insert, for use with a spray dispenser device, is made of a matrix material impregnated with a chemical composition that is made dry-to-the-touch and is held in place by a porous three-dimensional polyethylene film that prevents direct skin contact, while allowing the chemical composition to be dissolved in solution with a diluent fluid such as water. When the spray bottle is filled with water, sealed, and shaken, the fluid penetrates into the matrix material, and the chemical composition becomes dissolved in solution, thereby creating a cleaning, sanitizing or disinfectant solution that will remain stable and fully active in use. The recharge insert may be engaged with an insert locating adapter as may be desired.

18 Claims, 6 Drawing Sheets

RECHARGE INSERT FOR CLEANING, SANITIZING OR DISINFECTANT FLUID SPRAY SYSTEM

CROSS-REFERENCE TO RELATED APPLICATIONS

This application is a continuation-in-part of co-pending U.S. application Ser. No. 12/214,516 filed Jun. 20, 2008, which is a continuation-in-part of abandoned U.S. application Ser. No. 10/934,960 filed Sep. 7, 2004. Both prior applications are incorporated herein by reference.

TECHNICAL FIELD

This invention generally relates to spray bottle systems for dispensing cleaning, sanitizing or disinfectant fluids, and more particularly, to a recharge insert for use with such systems.

BACKGROUND OF INVENTION

Due to regulations curtailing the use of aerosol dispensers for chemical reagents that discharge foaming or pressurized gases or hydrocarbons into the atmosphere, the use of spray bottles that are manually pumped has become widespread. The typical spray bottle dispenser consists of a plastic container holding fluid with chemical reagent dissolved therein, which is sealed by a threaded cap mounting a sprayhead from which a diptube projects and extends downwardly into the body of the container. When the user operates a trigger on the sprayhead, the contents are pumped up into the sprayhead and sprayed out from a directional orifice or nozzle.

Many vendors sell separately bottles of fluid for refilling the spray dispenser bottle, or for transferring the sprayhead thereto when the contents of the first-purchased dispenser bottle are used up, so that the sprayhead and bottle can be reused. Often, the refill bottles contain a large volume of fluid so that the original dispenser bottle can be refilled more than one time before another bottle needs to be purchased.

This widely used type of spray dispenser system has several problems, which the present invention seeks to lessen or eliminate. One problem is that the refill bottles take up a lot of volume, which incurs additional shipping costs, storage costs, and demand for shelf space. Another problem is that a refill bottle must be sold for the specific types of fluid it is intended to refill. Thus, if a vendor sells different formulations of the same cleaner or different types of cleaners under the same product name, then a refill bottle must be sold for each grade and type of fluid.

A further problem is that pouring fluid from the refill bottle can incur spills or require potentially hazardous handling of caustic or toxic fluids. On the other hand, if the fluids must be made in very dilute concentrations for public safety in handling, then the cleaning ability or effectiveness of the product may be compromised. The refill bottles themselves are discarded after use, thus adding to the solid waste problem.

There have been various proposals for providing a rechargeable insert holding chemical in concentrated form which can be used with a spray dispenser system. For example, U.S. Pat. Nos. 3,655,096, 3,966,089, 4,088,246, and 5,421,483 show a capsule or cartridge holding concentrated material which is secured in the neck of the bottle and released by threading the sealing cap or a ringnut against it to puncture its bottom walls against a sharp element or to squeeze the concentrate out. These types of puncturable or burstable cartridge systems are costly to fabricate, complicated to operate, and potentially hazardous if a problem occurs and the user must open the container and reposition or remove a failed cartridge.

U.S. Pat. No. 5,529,216 shows another rechargeable spray dispenser system in which an elongated insert having one or more concentrate-containing compartments is inserted into the bottle, and a sharp end of the diptube is used to puncture through upper and/or lower sealing membranes in order to release the concentrate into the diluent fluid (water) filled into the bottle. However, this type of recharge insert necessitates a sharp-pointed diptube, as opposed to blunt ended diptube and filters normally supplied. Moreover, the inner seal must be punctured by the user thereby presenting a risk that concentrate will be spilled by the user. U.S. Pat. No. 6,540,109 discloses a rechargeable spray bottle dispenser including at least one chemical reservoir received within the bottle. The reservoirs contain concentrated chemicals and can be released into the bottle by bursting, puncturing or other suitable means. This type of design requires the modification of the spray bottles at the point of manufacture and cannot be used economically on the conventional spray bottles.

Sleevelet recharger designs have been in commercial use for several years in food service establishments where refillable spray bottles are used routinely. Historically they have been recharged with liquid concentrates, as opposed to powders or tablets, dispensed from larger containers, or automatically from captive blending centers. The prior use of spray bottle refills in these establishments and their employees' training to use clearly defined systems helped to make their adaptation to the use of the instant recharge system relatively seamless. Home use of spray bottle refills, however, has never been firmly established, even though the significant cost and space-saving opportunities have been promoted and recognized.

U.S. Pat. No. 6,250,511 shows dry-to-the touch elongated inserts, which contain chemicals that can be dissolved in water for cleaning purposes. These inserts are slipped onto the diptube of a spray bottle trigger, which incorporates a retainer device at the bottom of the diptube, which facilitates removal of the wet sleeve after activation. Another retainer design is described in U.S. application Ser. No. 10/934,960 filed Sep. 7, 2004. All of the foregoing patents and applications are incorporated herein by reference.

The technology disclosed in U.S. Pat. No. 6,250,511 has been in commercial use for over two years in food service establishments where refillable spray bottles have been used routinely for many years. Historically they have been recharged with liquid concentrates, as opposed to powders or tablets, dispensed from larger containers, or automatically from captive blending centers. The preference for use of the recharge system was driven by its demonstrated ability to reduce both shipping and inventory costs by over 90%.

Although the prior use of spray bottle refills in these establishments and their employees' training to use clearly defined systems helped to make their adaptation to the use of the instant recharge system relatively seamless, home use of spray bottle refills has never been established, even though the significant cost and space-saving opportunities have been promoted and recognized.

Extensive consumer research has indicated that broad scale home use of the spray bottle recharge system of the invention would be encouraged if its actual use could be simplified, and if its potential economies in terms of cost and space, and in terms of its potential to significantly reduce solid waste disposal were actively promoted. The refinements and improvements of the original recharge technology, as described herein, are intended to make that possible.

The aforementioned U.S. Pat. No. 6,250,511 and prior application Ser. No. 10/934,960 describe recharge sleevelet devices comprised of non-woven fibrous materials impregnated with cleaning, sanitizing, disinfecting and other liquid concentrates that are specially designed and constructed to fit onto the diptubes of standard spray bottle assemblies.

Whereas these sleevelet devices are designed for use with standard sprayer systems in use worldwide, there are significant disadvantages that add cost, require customized superconcentrates due to the limited loading capacity of the nonwoven sleeves, involve potentially confusing methods for activating and inactivating the system, and require special components (e.g. retainers, etc.) which otherwise may not be needed. Because these sleevelets must be sized and shaped to slip on and off the diptubes and to fit into and be removable from standard spray bottle openings of approximately 1 inch in diameter, dedicated custom designed and engineered technology is needed to seal the nonwoven sleeves, and to precisely control concentrate loading at acceptable production speeds and costs. The specially designed and custom molded retainer that is attached to the tip of the diptube is also needed to safely extract the impregnated sleeve from its packaging, to place it into the spray bottle, and to extract the activated sleeve from the spray bottle.

The recharging system described herein avoids the foregoing pitfalls and provides advantages and improvements as will be seen in further detail below.

The present inventive concept will overcome these disadvantages, add beneficial capabilities and significantly simplify usage of the system. It is facilitated by the availability of wide-mouthed bottles with screw threads and an opening of at least two inches. Additionally, squeeze bottles of this type are available in convenient 16, 24 and 32 ounce sizes. These can be fitted with a custom molded closure that can accommodate standard screw-cap pump sprayer devices. In this case, the pump sprayer is screwed onto an adaptor, which in turn is screwed onto the top of the wide-mouthed bottle, as will be seen in the devices described below. Another wide-mouthed spray bottle design has been described in U.S. Pat. Appln. Publication No. 2009/0050640 utilizing a custom designed spray nozzle assembly that is attachable to the outer wall of the cylindrical container.

SUMMARY OF INVENTION

In the present invention, a recharge insert, for use with a spray dispenser device having a container body, a sprayhead mounted with a sealing cap, and an elongated diptube which is inserted into the container body before use, is comprised of a 3 or 4 layer composite, the core of which is impregnated with a chemical composition that is maintained dry-to-the-touch by a porous three-dimensional top sheet. The recharge insert is preferably a multi-ply matrix formed in an elongated shape, wherein the outer three-dimensional top sheet layer is porous to fluid filled into the container body so that the fluid can penetrate into the matrix core material and dissolve the chemical composition impregnated therein, while preventing direct skin contact with the chemical composition prior to activation.

In a preferred embodiment, the absorbent core material is a synthetic or natural binder-free, nonwoven substrate. The core substrate should preferably be comprised of natural or synthetic fibers such as PLA, rayon, tencel, and/or other biodegradable substrates that can be needle punched and bonded with no chemical binders. The cleaning, sanitizing or disinfectant chemical composition is impregnated in the core substrate by slot coating a precise amount of the chemical concentrate. The outer top sheet material has a desired porosity to allow fluid to penetrate through the material and dissolve the chemical composition impregnated therein.

When the spray bottle containing the insert is filled with water, sealed, and shaken, the chemical composition becomes dissolved in solution, thereby creating a ready-to-use cleaning, sanitizing or disinfectant solution that will remain stable and fully active. The backing material of the subject composite is a self-supporting film, placed within the container, with labeling on the side facing outward and for holding the insert in an upright position.

Other objects, features, and advantages of the present invention will be explained in the following detailed description of the invention having reference to the appended drawings.

In the present invention, there is presented a recharge insert, for use with a spray dispenser device having a container body, a sprayhead mounted with a sealing cap, and an elongated diptube which is inserted into the container body during use. The insert is comprised of adsorptive material, of one or more layers. The absorbent material is impregnated with a chemical composition which will dissolve when contacted with a diluent fluid such as water. The recharge insert is formed in an elongated rectangular shape. The insert material has a three-dimensional top sheet layer comprised of a three-dimensional polyethylene film which is porous to fluid filled into the container body so that the fluid can penetrate into the insert material and dissolve the chemical composition which has been impregnated therein, while simultaneously protecting the user from direct skin contact with the chemical composition in handling the insert prior to activation. A porous web or mesh matrix is suitable for this purpose.

In a preferred embodiment, the insert is a multiple layered composite. The top sheet and backing sheet are bonded together around the absorbent core by heat and pressure. The optional barrier film layer is bonded to the backing sheet and can be manually released prior to activation. The cleaning, sanitizing or disinfectant chemical composition is impregnated into the adsorptive material by slot-coating. The three-dimensional top sheet protects the user from direct skin contact with the chemical composition impregnated into the absorptive core and has a desired porosity needed for dissolution.

The insert can be easily inserted into the container without requiring the user to touch the treated core by hand, thereby eliminating any possibility of direct contact between the user's skin and the treated core containing highly concentrated and potentially skin sensitizing or irritating treatment compositions. The insert includes a three-dimensional top sheet that also holds the treated substrate in place and allows diluent fluid to flow in and out freely. When the spray bottle, with insert contained therein, is filled with water, sealed, and shaken, the chemical composition becomes dissolved, thereby creating a ready-to-use cleaning, sanitizing or disinfectant solution that will remain stable and fully active compared to the use of raw liquid concentrates preparing ready-to-use solutions, these inserts are portion controlled and far safer to handle and use because the matrix is designed to prevent direct skin contact with the chemical composition and is not subject to being spilled, broken or swallowed.

The objects, features, and advantages of the present invention will be explained in the following detailed description of the invention having reference to the appended drawings.

BRIEF DESCRIPTION OF DRAWINGS

FIG. 6b is an end view of the two-ply embodiment of the recharge insert core assembly shown in FIG. 6a.

DETAILED DESCRIPTION OF THE PREFERRED EMBODIMENTS

The subject rechargeable liquid spray system is comprised if: a. a container for holding a liquid for spraying applications and having a neck opening sufficiently wide to receive or remove a replaceable spray charge insert; b. a charge insert locating adapter engaged in the container neck opening and having a slot there through adapted for receiving and holding the replaceable spray charge insert within the liquid container; c. a replaceable spray charge insert for activating a liquid for spraying applications whereby the spray charge insert is engaged in the locating adapter, the replaceable spray charge insert being comprised of a backing layer of barrier film packaging material effective for safely conveying active spray agents of the spray charge insert and having sufficient stiffness to maintain a generally vertical orientation of the spray charge insert when deployed within the liquid container; the layer of barrier film having thereon a next layer of absorbent material for carrying active spray agents; the layer of absorbent material having thereon a further layer of a porous three-dimensional covering for protecting the absorbent layer while facilitating absorption of the active spray agents when diluted with liquid; and a further outer layer of removable barrier film packaging material for protecting the spray charge insert active spray agents before use and exposing the active spray agents when the insert is deployed for use within the liquid container; and d. a spray head engaged above the upper neck opening of the liquid container and locating adapter or collar and having a dip tube for reaching liquid from the bottom of the container, the spray head also having a trigger for drawing the liquid and a nozzle for spraying the activated liquid on a surface.

Figure 1:
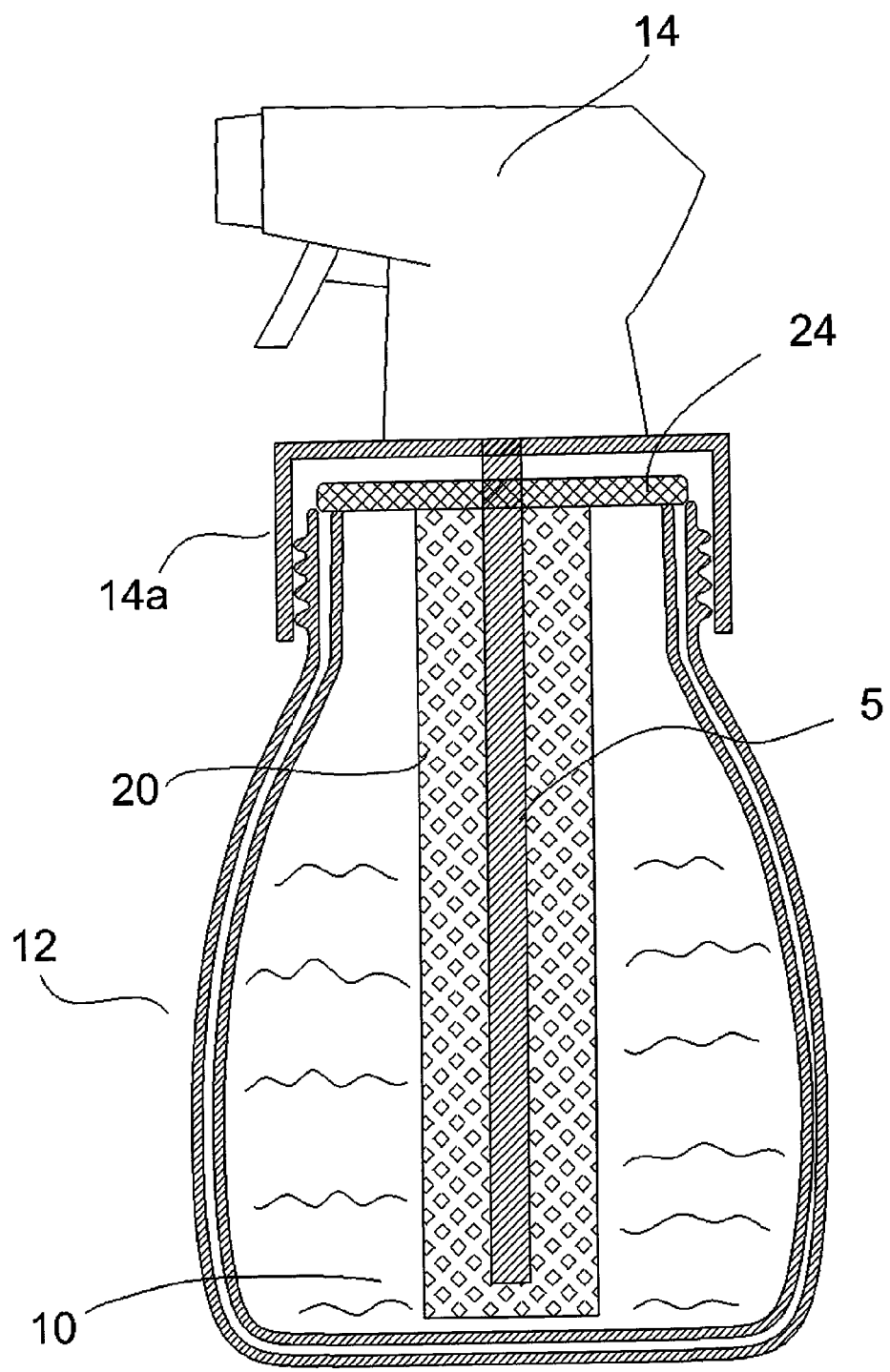
FIG. 1 is a cross-sectional view of a spray bottle apparatus for use in an embodiment of the subject system.

FIG. 1 is a cross-sectional view of a spray bottle apparatus 1 for use in an embodiment of the subject system. Spray system apparatus 12 has a standard trigger spray head 14 configured to engage and fit on a wide-mouth style container 12. Spray head 14 also has a diptube 5 for drawing the liquid contents of the container. In FIG. 1, recharge insert 10 is shown in relation to container 12, spray head 14 and diptube 5. Recharge insert 10 is described in further detail below.

Figure 2A:
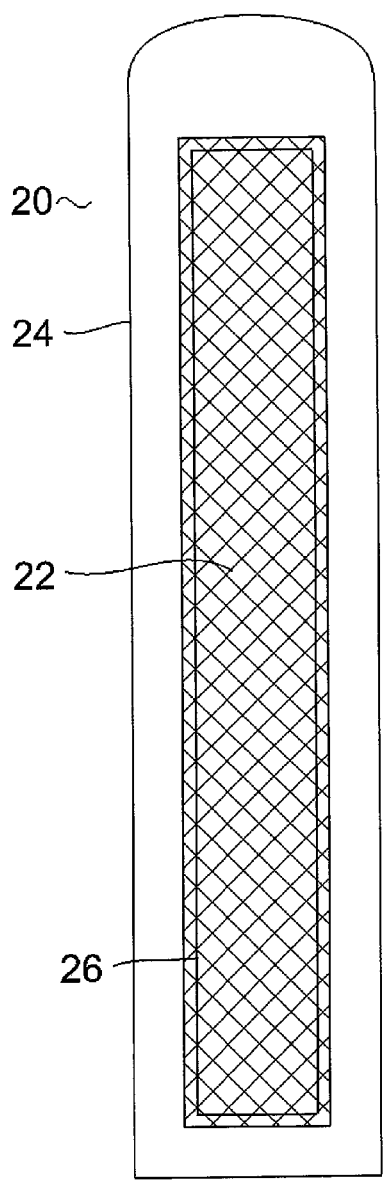
FIG. 2a is a front elevation view of an opened recharge insert assembly.

FIG. 2a is a front elevation view of an opened recharge insert assembly 20 wherein functional insert 22 has a three-dimensional mesh covering 26 installed upon backing film layer 24.

Figure 2B:
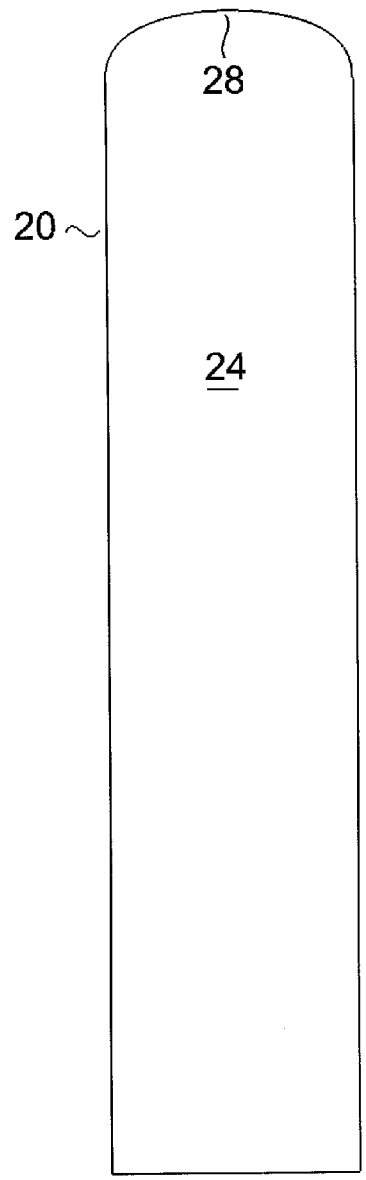
FIG. 2b is a view of an embodiment of the recharge insert assembly packaging.

FIG. 2b is a rear elevation view of the opened recharge insert assembly 20 shown in FIG. 2a showing backing 24 which is suitable for printed advertising, directions or the like.

Figure 2C:
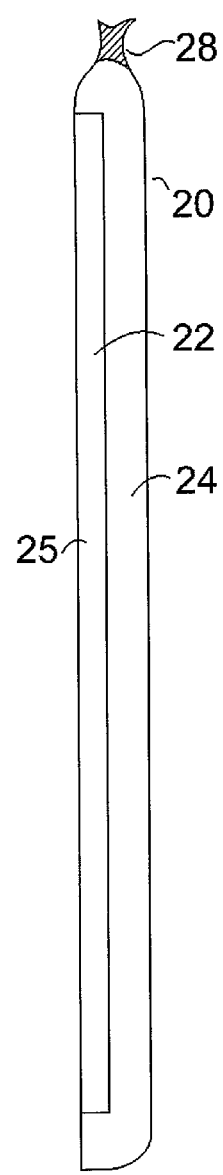
FIG. 2c is a cross-sectional elevation of the three-layered composite recharge insert assembly shown in FIGS. 2a and 2b.

FIG. 2c is a cross-sectional elevation of the recharge insert assembly shown in FIGS. 2a and 2b. In FIG. 2c, assembly 20 has functional insert 22 as well as backing 24 and front barrier film cover 25, which may be peeled away from the backing at adhesive area 28.

Figure 3:
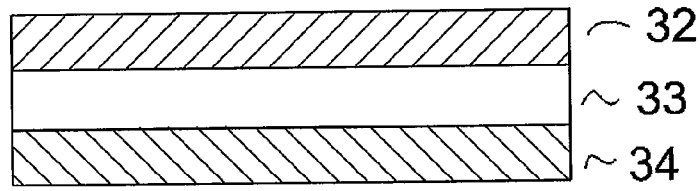
FIG. 3 is a cross-section of an embodiment of a three-ply recharge insert assembly.

FIG. 3 is a cross-section of an embodiment of a three-ply recharge insert assembly 30 having three-dimensional top sheet 32, middle absorbent core layer 33 and bottom backing sheet layer 34.

Figure 4:
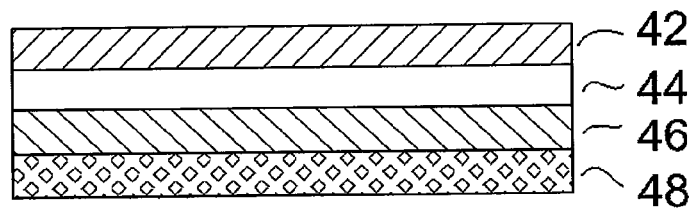
FIG. 4 is a cross-section of another embodiment of a four-ply recharge insert assembly.

FIG. 4 is a cross-section an embodiment of a four-ply recharge insert assembly 40 having backing sheet 42, middle absorbent core layer 44, a three-dimensional top sheet layer 46 and a releasable barrier film layer 48.

Figure 5:
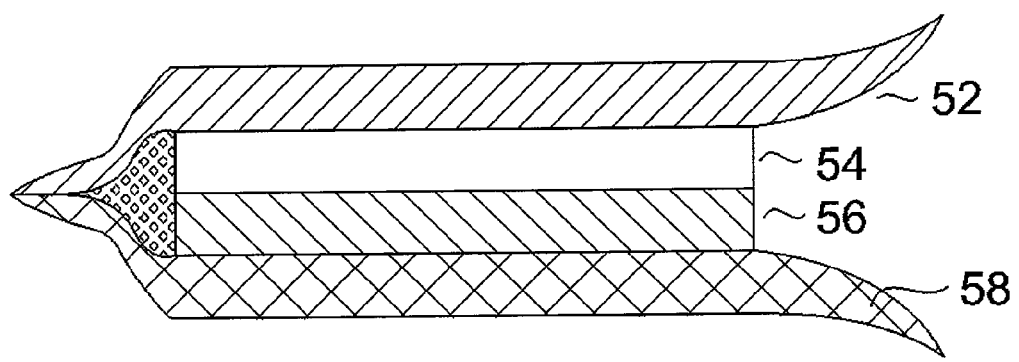
FIG. 5 is a cross-section of a further embodiment of a multi-ply recharge insert assembly.

FIG. 5 is a cross-section of a further embodiment of a multi-ply recharge insert assembly 50 wherein outer packaging layers 52 and 58 have been partially peeled away to expose functional insert layers 54 and 56. Void 59 is depicted in this figure between sealed layers 52 and 58.

Figure 6B:
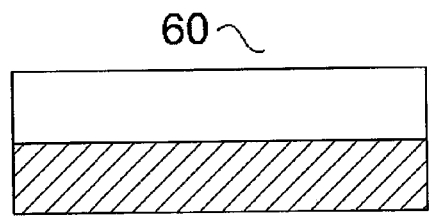
Figure 6A:
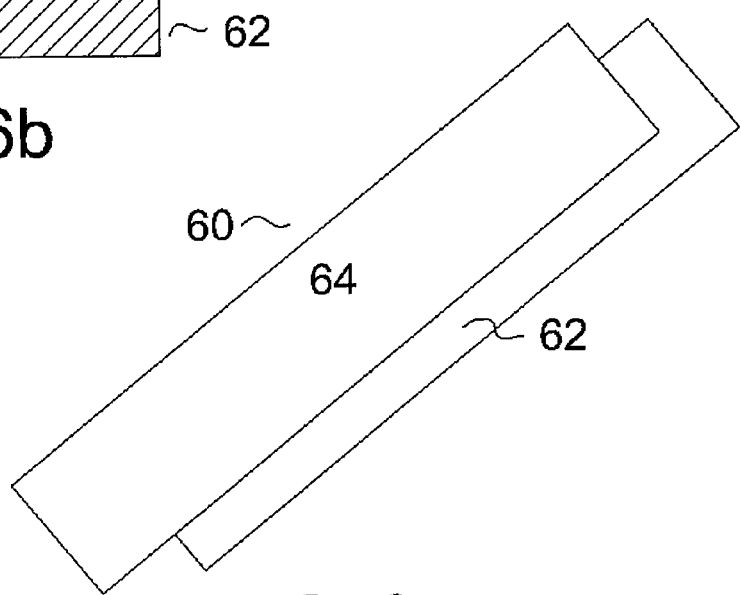
FIG. 6a is a perspective view of a two-ply embodiment of the recharge insert core assembly.

FIG. 6a is a perspective view of an embodiment of recharge insert assembly 60 having a two-ply structure, wherein backing 62 is shown in relationship to functional insert layer 64. FIG. 6b is an end view of the two-ply structure of the recharge insert assembly 60 shown in FIG. 6a.

Figure 7:
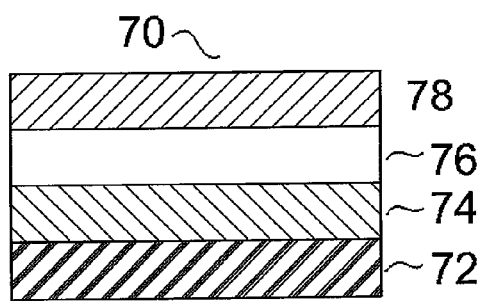
FIG. 7 is an end view of a four-ply recharge insert core assembly.

FIG. 7 is an end view of an embodiment of recharge insert assembly 70 having a four-ply structure having lower barrier layer 72, functional insert layer 74, porous mesh layer 76, and upper or outer barrier layer 78.

Figure 8:
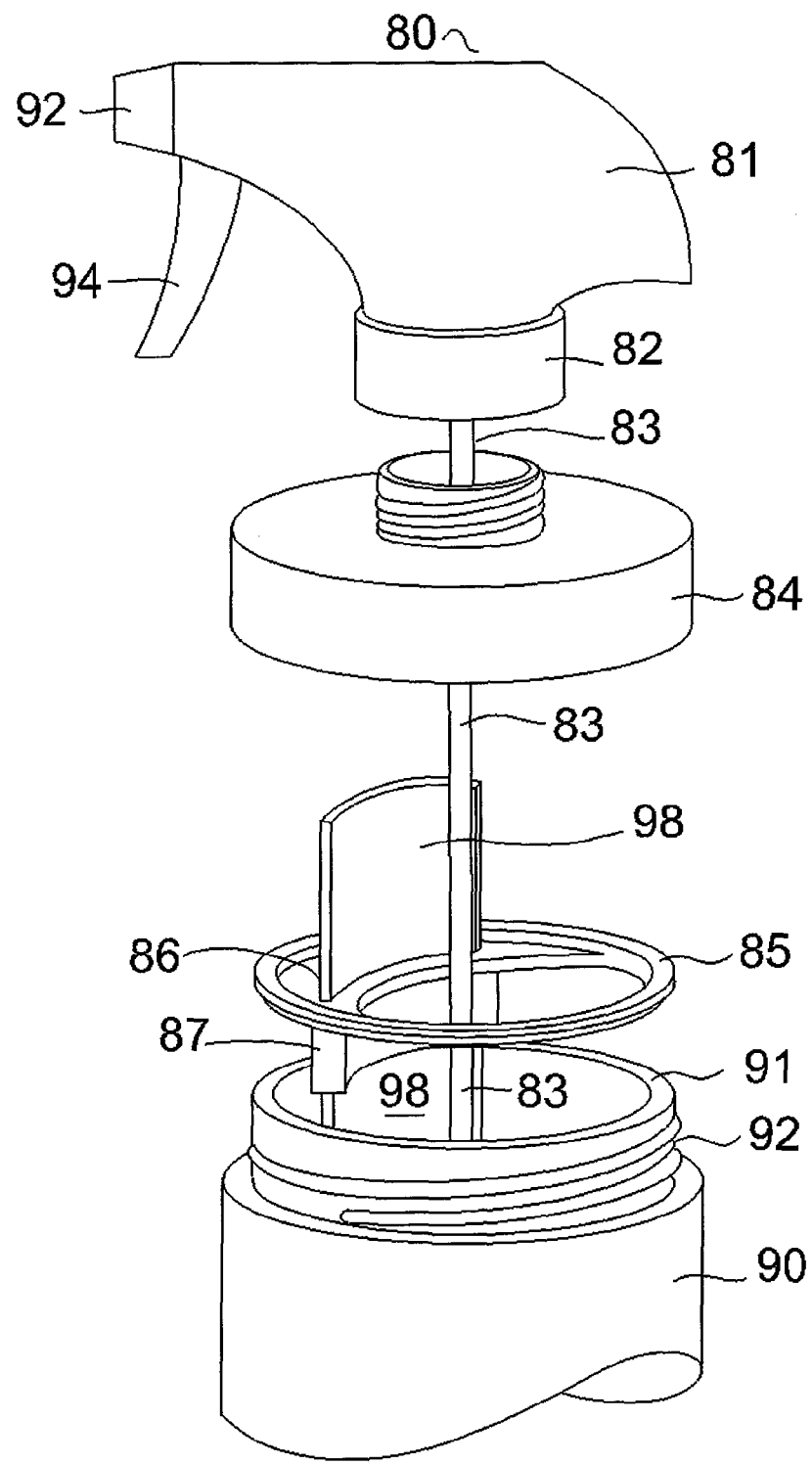
FIG. 8 is an exploded view of an embodiment of the subject recharge insert adapter assembly showing the recharge insert held firmly in an upright position with the labeling facing outwardly.

FIG. 8 is an exploded view of an embodiment of the subject recharge insert assembly 80 having spray head 81, nozzle 92, trigger 94, diptube 83 and screw cap 82 for engaging screw threads on collar 84. Collar 84 is configured to be placed in the top part of container 90 and is adapted to hold a recharge insert in opening 86, which is reinforced in this embodiment by descending portion 87. In this manner, a recharge insert will be held upright near the side wall of the bottle for easy viewing of the labeling. Collar 84 may be screwed onto container 90 with threads 92 at container opening 91 which engage insert adapter 85 provided with an opening 86 and reinforced by a descending portion 87. In this Figure, spray recharge insert 98 has been placed partially in insert adapter 85 and a portion of insert 98 can also be seen within container 90.

Figure 9:
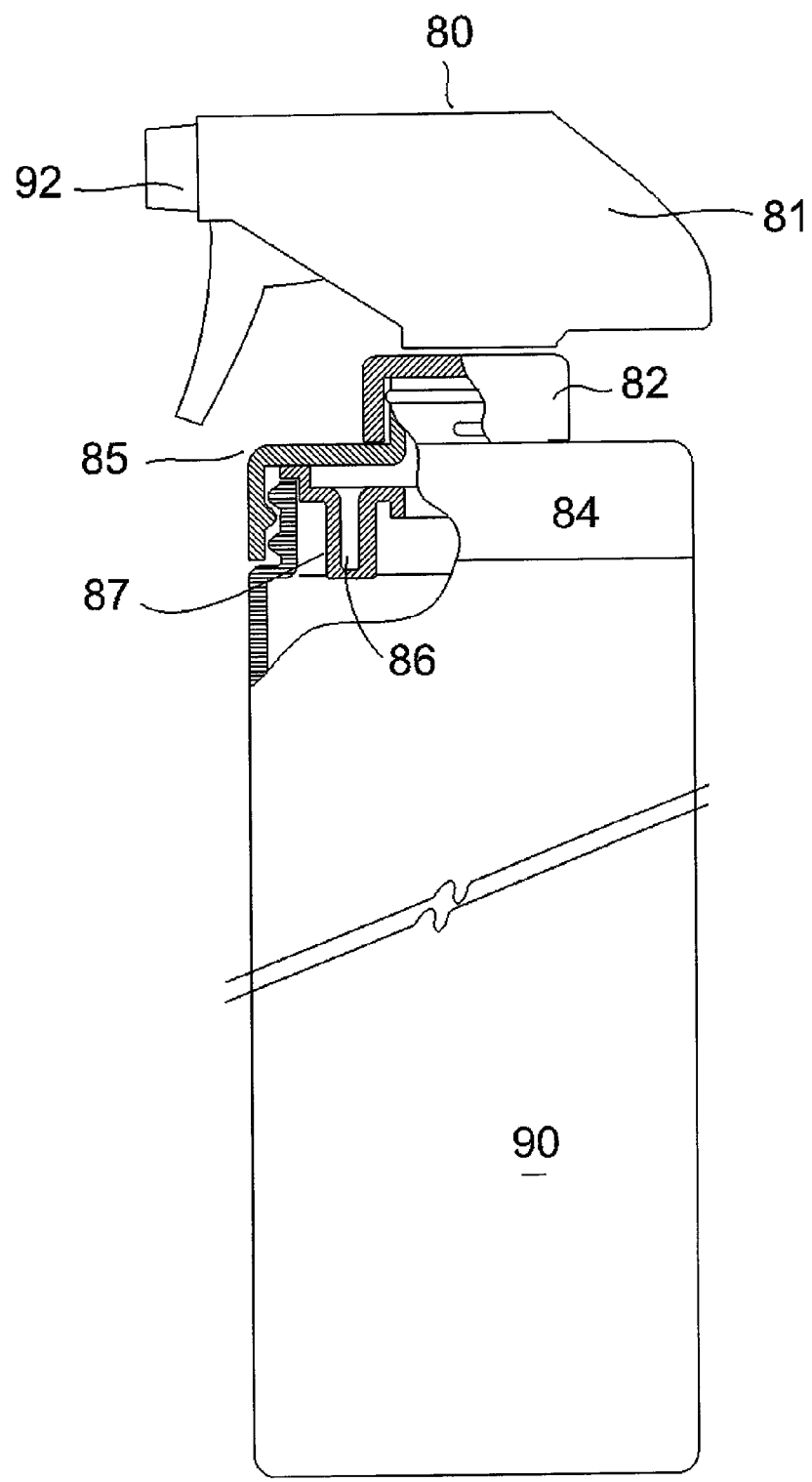
FIG. 9 is a partial cross-section of the spray recharge system insert shown in FIG. 8 with the bottle in the upright position.

FIG. 9 is a partial cross-section of the spray recharge system insert shown in FIG. 8 showing further details of collar 84 engaging insert adapter 85 and container 90.

This invention provides an easy-to-use and safe-to-handle device for creating ready to use cleaning, sanitizing, degreasing, and/or disinfecting spray bottle solutions. The recharge insert is an entirely self-contained device which is designed exclusively for use with wide-mouth spray bottles and spray heads. The compact, stand-alone insert makes it incredibly simple to recharge spray bottle solutions, and to thereby substantially reduce solid waste landfill contamination. They will also reduce the enormous shipping, handling, and storage cost associated with their prolific use commercially and at home.

Suitable translucent bottles having a satisfactorily wide container opening are commercially available in 16, 24 and 32 ounce sizes from Tablecraft, located in Gumee, Ill.

In addition to being easier to use, this new insert device is designed to accommodate use of larger dimensions of nonwoven materials without regard for the fiber blends involved that can effectively deliver significantly larger amounts of the concentrates. That's because the treated nonwoven cores of this new insert device are not ultra-sonically formed into sleeves, but instead are cut to the same dimension of about 1 inch by 8.5 inches, which represents as little as 8.5 sq. inches, or, potentially up to about 68 sq. inches of variable basis weights and fiber blends. Whereas that option can significantly expand loading capacity, it also mandates that the carrier device facilitate easy insertion and extraction of the impregnated nonwoven material into and from the dilute solution, and that it provide structural support for the nonwoven material when in the solution.

The unique insert and holding device is structurally designed to provide a mechanism that simplifies the procedure for creating a use-dilution while eliminating the need to handle or touch the cleaning, sanitizing or disinfecting agents impregnated into the nonwoven core in the process of doing so. All of that is accomplished by creating a three or four-ply structure, comprising an inner and optionally an outer layer of manually releasable barrier films that sandwich the core layers of nonwoven material and the three-dimensional film layer in the middle. Both outer film layers have a releasable adhesive coating on the inside that can be sealed with heat and pressure, and that can be opened by separating the film layers by hand. One of the two middle layers is comprised of absorbent nonwoven core material impregnated with the precise amount of liquid concentrate needed to create an effective use-dilution, cut to dimensions of approximately 1 inch by 8.5 inches. The top sheet layer of the insert is an apertured, three-dimensional, micro porous, flow-directing, material, comprised of a polyethylene film from Tredegar Film Products. It is laid over the impregnated core material, die-cut and sealed to the inner wall of one of the backing film layer in order to hold the impregnated material in place. This three-dimensional apertured material effectively prevents direct skin contact with the impregnated concentrate and also encourages rapid dilution of the concentrate. The two barrier film layers can be edge sealed to form a sanitary and a vapor barrier pouch, if necessary.

With this new insert device, the opportunities for creating a cleaning, sanitizing, degreasing or disinfectant use-dilutions are expanded considerably, due in part because the activation process itself is far more simplified. An end-user simply removes the two-piece top from the wide-mouth bottle, empties and refills the bottle with fresh water, removes the releasable film from one side of the pouch, and then places the remaining insert which contains the nonwoven core materials into the filled bottle thereby allowing the concentrate to be diluted and create a ready-to-use solution. The spray bottle as rendered in one of the drawings illustrates how this system can be assembled without having to build a whole new set of expensive spray bottle tooling and molds. A spray bottle system of this type is needed to accommodate the 2-inch wide insert of the invention which is a key element of the new concept, and which will be described in greater detail by the following.

The preference for use of the recharge system of the invention was driven by its demonstrated ability to reduce solid waste and both shipping and inventory costs by over 90%.

EXAMPLE 1

The subject recharge insert may be seen to facilitate simplification of several essential aspects of the spray system technologies, including reduced dependence on super concentrated formulations, less complicated fiber specifications and blends for the nonwoven cores, and easier to use inserts that include labels for creating specific ready-to-use cleaning solutions for use in wide-mouthed, unlabeled spray bottles, thereby reducing the necessity for using dedicated, pre-labeled spray bottles.

A no-rinse, food contact surface cleanser and sanitizer (EPA Reg. # 62401-7) was developed as a water-free formulation, small amounts of which are impregnated into a blended nonwoven substrate core to be used to create a ready-to-use solution that was tested and approved for safety and efficacy in accordance with the prescribed EPA test protocols. A 200 ppm quaternary cleaning and sanitizing solution was used. Two plys of treated nonwoven substrate are cut into 1×8 inch strips, which in turn are wrapped and heat sealed into a three layer structure with a barrier film backing, that incorporates product labeling on the outside, and a porous three-dimensional top sheet to facilitate dilution and prevent direct skin contact with the concentrate when handling the insert. This three-ply structure is then inserted into a discrete slot formed within the 2 inch wide opening of the 24 oz. wide mouthed spray bottle that is filled with water, which is then capped with a complementary spray and trigger assembly, which is configured for convenient assembly and use.

Concentrate Formulation (by Volume):

| | |
|---|---|
| Propylene Glycol | 90.7% |
| BTC 2125M[1] (80%) | 8.9% |
| FD&C Red #40 | 0.4% |
| | 100% |

[1]Quaternium ammonium compound

| Treated Nonwoven Insert: | Gram Wt. | % |
|---|---|---|
| Concentrate | 1.98 g | 52.3% |
| Nonwoven | 1.81 g | 47.7% |
| Treated Wt. | 3.79 g | 100% |

EXAMPLE 2

A heavy-duty degreaser formulation was prepared having a volatile concentrate that requires barrier packaging to maintain stability until used to create an appropriate spray bottle use-dilution. The concentrate's active ingredients include a dipropylene glycol n-butyl ether solvent and potassium hydroxide for adjusting the pH. The solvent contributes to its volatility, and also requires a more substantial gram load of the concentrate to be effective. For those reasons the nonwoven core substrate comprising a blend of fibers was somewhat heavier to hold and carry the higher add-on concentrate, and was assembled into a barrier-sealed four-ply composite structure insert to prevent loss of volatile active agents prior to use.

As with the sanitizer, there was no need for a retainer on the tip of the diptube, or for the ultrasonic formation of a sleeve to be mounted on the diptube of the sprayer assembly structure. Two plys of nonwoven composite incorporating a 4-fiber blend was slot-coated on both sides with an add-on of about 275% of the nonwoven's basis weight. Two 1×8 inch strips were then wrapped and discretely heat sealed between the barrier backing film (with labeling printed on the opposite side) and a three-dimensional porous cover sheet for holding the foregoing in place. A porous film top sheet was die cut to yield a 0.25 inch wide unsealed area around the entire edge of the backing film material, to which a peelable lidding film (i.e., product code 6985 from Ampac Flexibles) was sealed by heat and pressure to prevent any loss of active chemical agents. Just prior to use, this outer lid of film layer was removed by hand and the remaining three-ply insert structure was used to create the degreaser use-dilution with water in the ready-to-use spray bottle dispenser, in the same manner as with the sanitizing insert seen in Example 1 above.

In each example, a spray recharge insert was safely contained within its barrier layer packaging and was readily activated for spraying application when engaged with its insert adapter and diluted by the liquid contents of its respective container, thereby providing the spray system and apparatus of the present invention.

It will be recognized by those skilled in the art that many variations of the above descriptions may be employed in other embodiments of the subject invention.

The invention claimed is:

1. A rechargeable liquid spray system comprising: a. a container for holding a liquid for spraying applications and having a neck opening sufficiently wide to receive or remove a replaceable spray charge insert; b. a charge insert locating adapter engaged in the container neck opening and having a slot there through adapted for receiving and holding the replaceable spray charge insert within the liquid container; c. a replaceable spray charge insert for activating a liquid for spraying applications whereby said spray charge insert is engaged in said locating adapter, said replaceable spray charge insert being comprised of a backing layer of barrier film packaging material effective for safely conveying active spray agents of the spray charge insert and having sufficient stiffness to maintain a generally vertical orientation of the spray charge insert when deployed within the liquid container; said layer of barrier film having thereon a next layer of absorbent material for carrying active spray agents; said layer of absorbent material having thereon a further layer of a porous three-dimensional covering for protecting the absorbent layer while facilitating absorption of the active spray agents when diluted with said liquid; and d. a further outer layer of removable barrier film packaging material for protecting the spray charge insert active spray agents before use and exposing the active spray agents when the insert is deployed for use within the liquid container; wherein a spray head is engaged above the upper neck opening of the liquid container and locating collar and having a dip tube for reaching liquid from the bottom of the container, a trigger for drawing the liquid and a nozzle for spraying the activated liquid on a surface.

2. The system of claim 1, wherein the backing layer of barrier film packaging material layer of the rechargeable spray insert is a plastic film.

3. The system of claim 1, wherein the absorbent layer of the rechargeable spray insert is a synthetic or natural binder-free nonwoven substrate.

4. The system of claim 1, wherein the porous layer of the rechargeable spray insert is a three-dimensional textured mesh covering.

5. The system of claim 4, wherein the porous layer of the rechargeable spray insert is a non-woven textured mesh covering.

6. The system of claim 1, wherein the outer layer of the rechargeable spray insert is a barrier film packaging material layer.

7. The system of claim 6, wherein the outer barrier film layer is adhered to edges of the backing layer barrier film and is removable therefrom by peeling the outer layer away from the replaceable spray charge insert and backing layer thereby exposing the active spray ingredients for use.

8. The system of claim 1, wherein the active agents include cleansers, sanitizers and disinfectants.

9. The system of claim 1, wherein the liquid container is a transparent bottle permitting visibility of the replaceable spray charge insert and any indicia printed thereon.

10. The system of claim 1, wherein the insert locating adapter is an annular collar insert frictionally engaged to the opening of the liquid container.

11. The system of claim 10, wherein the collar is frictionally engaged to the inner neck of the liquid container by means of a frictional snap.

12. The system of claim 10, wherein the collar is engaged to the inner neck of the liquid container by means of complementary screw threads.

13. The system of claim 10, wherein the insert locating collar holds an insert in proximity to a side of the liquid container.

14. The system of claim 13, wherein the holder is adapted to locate a recharge insert near the side of a transparent liquid container.

15. The system of claim 1, wherein the spray head is engaged with said liquid container by means of a sprayhead screw cap.

16. The system of claim 1, wherein the spray head is engaged with said liquid container by means of a sprayhead snap cap.

17. The system of claim 1, wherein said liquid container is a spray bottle.

18. The system of claim 1, further comprising sufficient liquid to activate the active spray agents in the replaceable spray charge insert and thereby providing an activated spray liquid in the container.

* * * * *